United States Patent
Urheim

(10) Patent No.: US 9,554,645 B2
(45) Date of Patent: Jan. 31, 2017

(54) MODULAR EASE-OF-USE SHELVING SYSTEM

(71) Applicant: OPE AS, Stavanger (NO)

(72) Inventor: Lars Urheim, Stavanger (NO)

(73) Assignee: OPE AS, Stavanger (NO)

( * ) Notice: Subject to any disclaimer, the term of this patent is extended or adjusted under 35 U.S.C. 154(b) by 70 days.

(21) Appl. No.: 14/411,796

(22) PCT Filed: Jul. 4, 2013

(86) PCT No.: PCT/NO2013/000027
§ 371 (c)(1),
(2) Date: Dec. 29, 2014

(87) PCT Pub. No.: WO2014/007642
PCT Pub. Date: Jan. 9, 2014

(65) Prior Publication Data
US 2015/0189984 A1     Jul. 9, 2015

(30) Foreign Application Priority Data

Jul. 4, 2012   (NO) .................................. 20120775
Jul. 2, 2013   (NO) .................................. 20130921

(51) Int. Cl.
*A47B 96/00*   (2006.01)
*A47B 47/00*   (2006.01)
(Continued)

(52) U.S. Cl.
CPC ....... *A47B 47/0016* (2013.01); *A47B 47/0075* (2013.01); *A47B 47/0091* (2013.01);
(Continued)

(58) Field of Classification Search
USPC .................................................. 248/221.11
See application file for complete search history.

(56) References Cited

U.S. PATENT DOCUMENTS 3,747,885 A * 7/1973 Ciancimino ............ F16B 12/32
                                                         211/182
4,014,618 A * 3/1977 Kristiansen ............ A47B 96/14
                                                         248/188
(Continued)

FOREIGN PATENT DOCUMENTS

AT        001992       3/1998
DE      2833120 A1    2/1980
(Continued)

OTHER PUBLICATIONS

International Search Report and Written Opinion for PCT/NO2013/000027 dated Sep. 20, 2013.

*Primary Examiner* — Monica Millner
(74) *Attorney, Agent, or Firm* — Andrus Intellectual Property Law, LLP

(57) ABSTRACT

A bracket is for use in a modular construction system, wherein plates are mechanically connected in a releasable manner to form a structure. The plates comprise at least one hole in a part thereof, wherein the hole is configured for being coupled to the bracket. The bracket comprises at least two foot portions for being coupled to respective plates. Each foot portion comprises a gripper element for being inserted into the hole of the plate and a linking member connecting the at least two foot portions and establishing a predefined fixed distance and a predefined fixed relative orientation between said foot portions. The gripper element is configured for enlarging a diameter in at least one direction in a plane parallel to the plate to obtain a friction coupling between the bracket and the plate or between the bracket and a further bracket provided from another side of the respective plate, when activated in operational use, and for reducing the diameter of the gripper element in a first (Continued)

direction of the plane parallel to the plate to release the bracket from the plate, when deactivated in operational use.

15 Claims, 18 Drawing Sheets

(51) Int. Cl.
*A47B 47/04* (2006.01)
*F16B 12/20* (2006.01)
(52) U.S. Cl.
CPC ........ *A47B 47/042* (2013.01); *F16B 12/2009* (2013.01); *F16B 2012/209* (2013.01)

(56) References Cited

U.S. PATENT DOCUMENTS

| | | | | |
|---|---|---|---|---|
| 4,032,242 | A * | 6/1977 | Morris | F16B 12/46 248/188 |
| 4,242,969 | A * | 1/1981 | Checkwood | F16B 12/06 108/156 |
| 4,301,636 | A * | 11/1981 | Luria | A47B 47/0025 312/111 |
| 4,361,931 | A * | 12/1982 | Schnelle | E05D 5/08 16/252 |
| 4,421,366 | A | 12/1983 | Niziol | |
| 4,589,792 | A * | 5/1986 | Niziol | A47B 47/042 29/525.02 |
| 5,277,512 | A * | 1/1994 | Dwillies | A47B 47/0041 24/DIG. 53 |
| 5,788,395 | A * | 8/1998 | Grieser | F16B 12/2036 403/231 |
| 6,168,249 | B1 * | 1/2001 | Chien | A47B 47/03 312/223.2 |
| 6,547,477 | B1 * | 4/2003 | Huber | F16B 12/2009 403/231 |
| 2008/0072515 | A1 * | 3/2008 | Huhnerbein | F16B 12/2009 52/582.2 |
| 2008/0224470 | A1 * | 9/2008 | Erez | A47B 47/0016 285/330 |
| 2009/0302178 | A1 * | 12/2009 | Hampe | F16M 11/04 248/187.1 |

FOREIGN PATENT DOCUMENTS

| | | |
|---|---|---|
| DE | 4427293 A1 | 4/1995 |
| DE | 19621746 A1 | 12/1996 |

* cited by examiner

MODULAR EASE-OF-USE SHELVING SYSTEM

CROSS-REFERENCE TO RELATED APPLICATIONS

This application is the U.S. national stage application of International Application PCT/NO2013/000027, filed Jul. 4, 2013, which international application was published on Jan. 9, 2014, as International Publication WO2014/007642 in the English language. The international application is incorporated herein by reference, in entirety. The international application claims priority to Norwegian Patent Application No. 20120775, filed Jul. 4, 2012 and Norwegian Patent Application No. 20130921, filed Jul. 2, 2013, which applications are incorporated herein by reference, in entirety.

FIELD OF THE INVENTION

The invention relates to a bracket for use in a modular construction system, wherein plates are mechanically connected in a releasable manner to form a structure.

BACKGROUND OF THE INVENTION

A known modular construction system is described in U.S. Pat. No. 4,421,366. This document discloses an apparatus for forming any selected one of a plurality of different articles, such as seatings, storage, and sleeping units. Such articles comprises a plurality of panels each having inner and outer faces terminating in a perimetrical edge. And these articles further comprise a mechanism for detachably coupling any selected number of panels together in angular relation (this is done by using a bracket with bolts to screw the bracket to the panels). This is done such that the perimetrical edge of each panel is positioned inwardly of the outer face of an adjacent angularly related panel and the outer face of each panel is positioned outwardly of the perimetrical edge of the adjacent angularly related panel to provide outwardly opening openings adjacent the adjacent perimetrical edges of adjacent panels. One aspect of the apparatus includes a coupling for coupling adjacent angularly related panels to form outward opening openings at the adjacent ends of adjacent panels.

A problem with the known modular construction system is that it is not user friendly.

SUMMARY OF THE INVENTION

It is a first object of the invention to provide an improved modular construction system, which is more user friendly. The invention is defined by the independent claims. The dependent claims define advantageous embodiments.

In a first aspect the invention provides a bracket for use in a modular construction system, wherein plates are mechanically connected in a releasable manner to form a structure, wherein the plates are provided with at least one hole in a part thereof, wherein the hole is configured for being coupled to the bracket. The bracket comprises:

at least two foot portions for being coupled to respective plates, wherein each foot portion comprises a gripper element for being inserted into the hole of the plate and a linking member connecting the at least two foot portions and establishing a predefined fixed distance and a predefined fixed relative orientation between said foot portions. The bracket is characterized in that the gripper element is configured for enlarging a diameter in at least one direction in a plane parallel to the plate to obtain a friction coupling between the bracket and the plate or between the bracket and a further bracket provided from another side of the respective plate, when activated in operational use, and for reducing the diameter of the gripper element in a first direction of the plane parallel to the plate to release the bracket from the plate, when deactivated in operational use.

The effect of the features of the apparatus in accordance with the invention will be explained hereinafter. When the bracket is used for connecting said plates the bracket is inserted with its gripper element in a hole of the plate. Depending on the embodiment chosen there are different scenarios possible. In a first scenario a further bracket is provided entering the same hole from the other side to meet the first-mentioned bracket and the respective gripper elements are designed to establish a friction coupling with the other bracket. In a second scenario the hole of the plate is configured such that after activation of the bracket the enlarging of the diameter of the gripper element is sufficient to establish a friction coupling between the bracket and the plate. As is made clear from the above the bracket in accordance with the invention effectively replaces the combination of the bracket and bolts in the prior art, and thus provides a very convenient means for connecting the plates together by just using one type of devices only, i.e. the bracket of the invention. Expressed differently, the bolts are rendered superfluous by the invention. In other embodiments of the modular system in accordance with invention the further bracket that is entered from the other side is a simple end bracket.

In an embodiment of the bracket of the invention the bracket is designed to tolerate some variations in the predefined fixed distance and a predefined fixed relative orientation.

In an embodiment of the bracket of the invention each foot portion comprises a protrusion element extending substantially in a second direction perpendicular to the first direction within the plane parallel to the plate, wherein the protrusion element is provided with a recess having inner walls for receiving a respective gripper element of a respective similar foot portion of a further bracket. The advantage of this embodiment is that the protrusion element renders it possible to make one bracket grip into another similar bracket.

In an embodiment of the bracket of the invention the bracket has a single configuration for the gripper element and the protrusion element such that it may grip into a further configuration of a respective gripper element and a respective protrusion element of a further bracket similar to itself. A standard configuration for the gripper element and the protrusion element is very advantageous as this enables the bracket to grip into further bracket that is the same. Within a single bracket the orientation of the gripping part and the protrusion element may be rotated relative to the orientation of the foot portion and this rotation may be different for different foot portions within the same bracket.

In an embodiment of the bracket of the invention the gripper element is provided with at least two arms spaced apart and mechanically coupled with each other by means of a connecting member, each arm having a respective outer wall that is at least partially movable and/or rotatable in an outward and inward direction, respectively. This embodiment constitutes a convenient manner of enabling a gripper element to enlarge its diameter in one direction.

In an embodiment of the bracket of the invention the arms are each coupled to the connecting member via a respective pivot point, wherein said outward rotation and/or moving of said respective arms around the respective pivot points starting from a respective release position, causes the enlarging of the diameter of the gripper element. The pivoting movement in this embodiment provides a very simple solution to expanding a diameter of the gripper element. In an embodiment the pivoting may be combined with a deformation of said gripper element. Many variations are possible, as long as there is an increase in diameter of the gripper element.

In an embodiment of the bracket of the invention the bracket further comprises an expansion member, with a tapered surface, wherein said outward rotation and/or moving of said arms is effected by pressing the expansion member in between said arms towards the connecting member when the bracket is activated in operational use. The use of a tapered activation member that is pressed in between the arms constitutes a first way of increasing the diameter of the gripper element.

In an embodiment of the bracket of the invention each arm is provided with a respective activation member for forcing a rotation of the respective arm around the respective pivot point, wherein said outward rotation of said arms is effected by pressing said activation member in the direction of the connecting member for pivoting the respective arms around their respective pivot points when the bracket is activated in operational use. In this embodiment the respective arms are advantageously rotated by means of a the respective activation members which are mechanically coupled to the respective arms to apply a momentum on said arms in case the activation members are moved.

An embodiment of the bracket of the invention further comprises a linking rod and a lever acting upon said linking rod for effecting said pressing when the bracket is activated in operational use. In this embodiment the linked rod acts upon the gripper element or the expansion member which acts upon the gripper element. Pulling the linked rod thereby causes said pressing and thereby said arms of the gripper element are rotated such that the diameter of the gripper element is enlarged when the bracket is activated. In an embodiment two phases may be distinguished during said pressing. In the first phase there is an outwards movement of said arms of said gripper element such that they contact and grip into the protrusion element of a further bracket. In the second phase there is an upward movement such the protrusion element of the further bracket is pulled towards the bracket to establish a firm coupling between the brackets and a firm grip on the respective plate.

An embodiment of the bracket of the invention further comprises an elastic member for bringing the bracket in a respective release position when the bracket is deactivated in operational use. In this embodiment the elastic member is conveniently used to produce a force which helps to deactivate the bracket. In an alternative embodiment the gripper element may have such elasticity by itself. In a further embodiment elastic member is mechanically coupled to said at least two arms.

In an embodiment of the bracket of the invention the gripper element is provided with a toothed surface on the outer walls to increase the friction between the gripper element and the plate or between the gripper element and the further bracket. The toothed surface helps to increase the friction in the friction coupling.

In an embodiment of the bracket of the invention the protrusion element is provided with a further toothed surface on the inner walls defining the recess, wherein the further toothed surface is configured for receiving the toothed surface of the gripper element when the bracket is activated in operational use. The further toothed surface helps to increase the friction in the friction coupling.

In an embodiment of the bracket of the invention the bracket comprises two foot portions that are connected by the linking member for establishing a respective right angle between said foot portions to form an edge bracket for establish a further respective right angle between said two plates. This embodiment constitutes a first main variant of the bracket of the invention, which is very useful for creating an edge bracket, i.e. a bracket which mechanically couples two plates in a mutual orientation.

In an embodiment of the bracket of the invention said foot portions are configured such that, when the bracket is rotated over 180 degrees with respect to a virtual axis which divides the respective right angle in two equal angles of 45 degrees, the configuration of the respective gripper element and the respective protrusion element is rotated over 90 degrees, wherein the configuration of each respective foot portion is such that the respective gripper element and the respective protrusion element extend in orthogonal and parallel directions only with respect to the respective direction in which the respective foot portion extends. By designing the edge bracket in this way it is ensured that with using a single type of edge bracket it is always to possible to connect with another bracket from the other side. In some cases, the bracket only needs to be rotated by the earlier mentioned 180 degrees with respect to the earlier mentioned virtual axis. It must be explicitly mentioned that another embodiment exists, wherein the edge bracket is designed to be rotation symmetrical with respect to this axis. In that embodiment the configuration of the gripper element and the protrusion element must be rotated by 45 degrees within the plane of the foot portion in order to facilitate parallel and anti-parallel orientations of two brackets.

In an embodiment of the bracket of the invention the bracket comprises three foot portions that are connected by the linking member for establishing a respective right angle between said foot portions to form a corner bracket for establishing further respective right angles between pairs of said three plates. This embodiment constitutes a second main variant of the bracket of the invention, which is very useful for creating a corner bracket, i.e. a bracket which mechanically couples three plates in a mutual orientation.

In an embodiment of the bracket of the invention said foot portions are configured such that, when the bracket is rotated over 120 degrees with respect to a virtual axis which divides the respective right angles in two equal angles of 45 degrees, the configuration of the respective gripper element and the respective protrusion element remains the same, wherein the configuration of each respective foot portion is such that the respective gripper element and the respective protrusion element extend in a direction making a 45 degrees angle with respect to the respective direction in which the respective foot portion extends. The rotation symmetry in this design ensures that with using a single type of edge bracket it is always to possible to connect with another bracket from the other side.

In a second aspect the invention provides a modular construction system comprising at least two plates which are mechanically coupled in a releasable manner by means of a bracket in accordance with the invention. Such system greatly benefits from the bracket of the invention

BRIEF DESCRIPTION OF THE DRAWINGS

These and other aspects of the invention are further explained with reference to the drawings, wherein.

Figure 1:
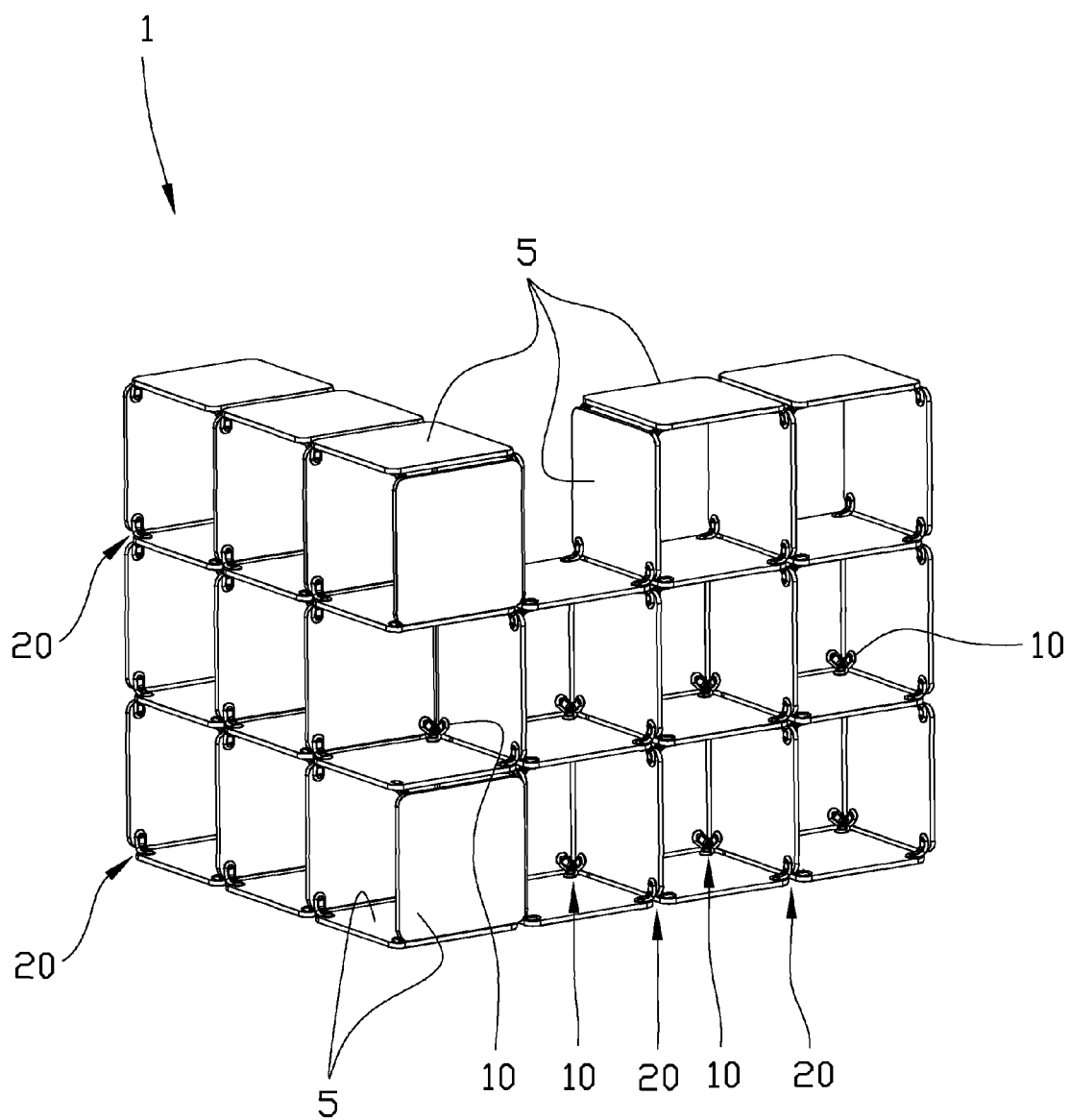
FIG. 1 shows discloses an embodiment of a modular construction system in accordance with the invention.

LIST OF REFERENCE NUMERALS 1 modular construction system
5 plate for modular construction system
7 hole in plate
7' blind hole in plate
9 modified insertion caps
10 corner bracket for modular construction system
11 linking member
12 foot portion
13 gripper element
13A arms of gripper element
13W outer walls of gripper element
13' toothed surface
14 protrusion element
14A arm of protrusion element
16 lever
17 linking rod
18 elastic member
20 edge bracket for modular construction system
21 linking member
22 foot portion
22G hole in foot portion
23 gripper element
23A arms of gripper element
23W outer walls of gripper element
23' toothed surface
24 protrusion element
24A arm of protrusion element
26 lever
27 linking rod
27' locking foot of linking rod
28 elastic member
30 end bracket
31 end plate
34 protrusion element
34R recess
34W inner side walls of recess
34' toothed surface
50 expansion member
51 tapered surface
D1 first direction
D2 second direction (orthogonal to the first direction)
SA1 virtual axis of edge bracket 20
SA2 (further) virtual axis of corner bracket 10
DFP direction in which the foot portion extends

DETAILED DESCRIPTION OF THE EMBODIMENTS

The present invention is related to a modular shelving system, created for flexibility and efficient assembly. By combining brackets and a variety of single sheets, the system allows for endless opportunities for the user to design and redesign his/her system over and over again. The system has no double walls, and utilizes the sheet materials in an optimal fashion.

In order to facilitate the discussion of the detailed embodiments a few expressions are defined hereinafter.

Throughout this description the term "plate" should be interpreted as a solid flat object which extends in substantially two dimensions. In this description this feature is also being referred to as "sheet".

FIG. 1 shows discloses an embodiment of a modular construction system 1 in accordance with the invention. The system 1 comprises a plurality of plate 5 which are mechanically connecting together by means of brackets 10, 20. In this embodiment there are two types of brackets, namely edge brackets 20 being configured for connecting two plates 5 under a right angle, and corner brackets 10 being configured for connecting three plates 5 under right angles with respect to each other.

Figure 2:
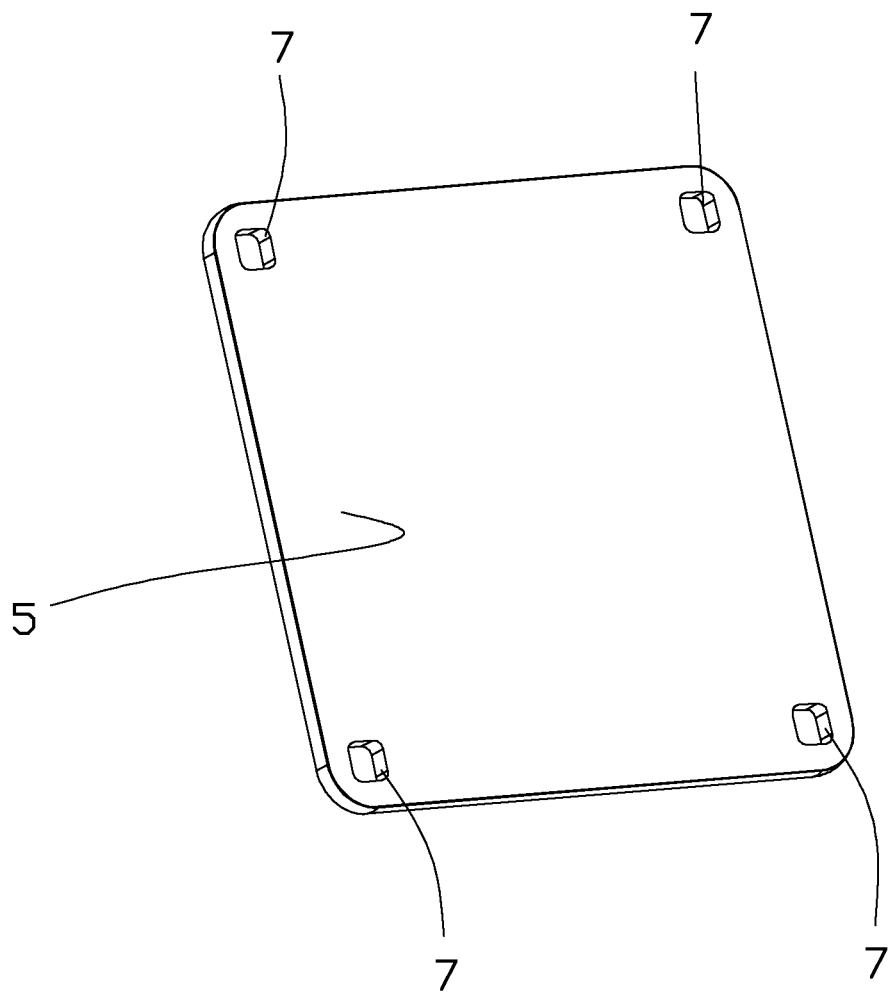
FIG. 2 shows a plate for use in the modular construction system of FIG. 1.

FIG. 2 shows a plate 5 for use in the modular construction system 1 of FIG. 1. The plate 5 comprises four holes 7, one near each corner. One of the goals of the invention is to provide an easy-to-use system. It is therefore preferred, but not essential, that there is as little different components as possible in the system 1. Preferably, the system 1 comprises only one standardized plate in terms of size, weight, thickness, hole openings, hole location, etc. However, it is also possible to provide a plurality of different plates differing in size, shape, etc. In any case all such plates 5 will benefit from the bracket in accordance with the invention, as will be discussed with reference to the further drawings.

Figure 3:
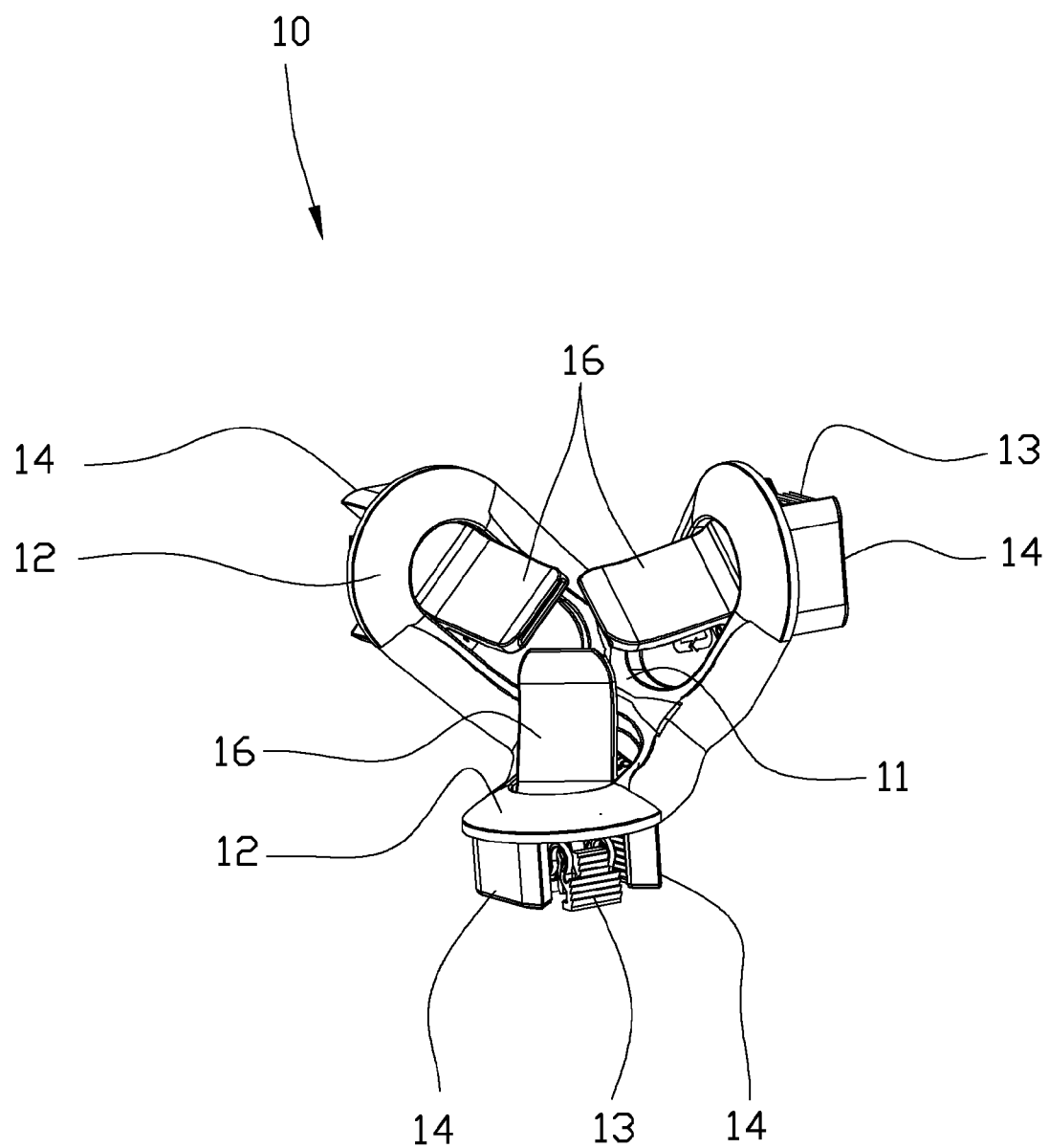
FIG. 3 shows an embodiment of a bracket in accordance with the invention while in a deactivated state.
Figure 4:
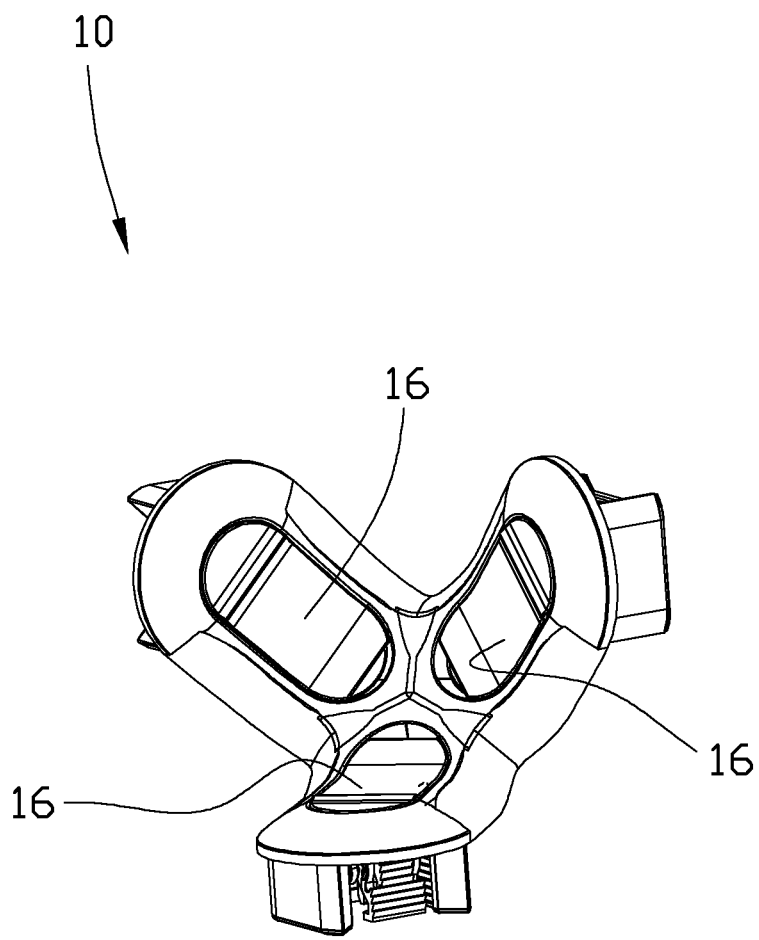
FIG. 4 shows the same bracket as FIG. 3 while in an activated state.

FIG. 3 shows an embodiment of a bracket 10 in accordance with the invention while in a deactivated state. FIG. 4 shows the same bracket 10 as FIG. 3 while in an activated state. The bracket 10 comprises three foot portions 12 which are connected together by means of a linking member 11. Each foot portion 12 comprises a gripper element 13 which is configured for being inserted into the hole 7 of a respective plate 5. The gripper element 13 comprises two arms 13A and is mechanically controlled by a lever 16. The diameter in a direction in a plane parallel to the plate 5 can be enlarged by pressing the lever 16 towards the linking member 11. This is being referred to as activating the bracket 10. Releasing the lever 16 to reduce the diameter of the gripper element 13 is being referred to as deactivating the bracket 10. More details about the bracket of FIGS. 3 and 4 will be given hereinafter.

Figure 5:
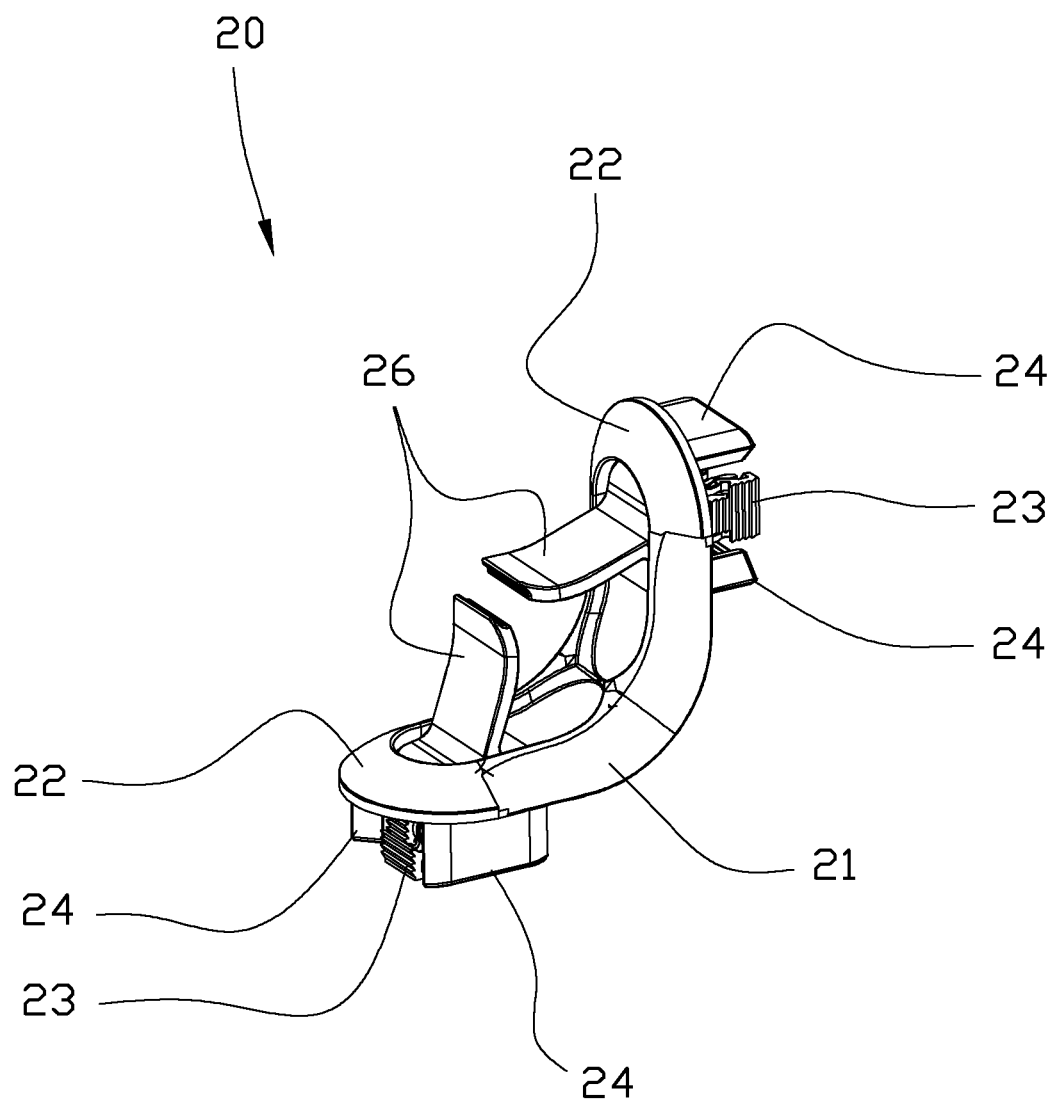
FIG. 5 shows another embodiment of a bracket in accordance with the invention while in a deactivated state.
Figure 6:
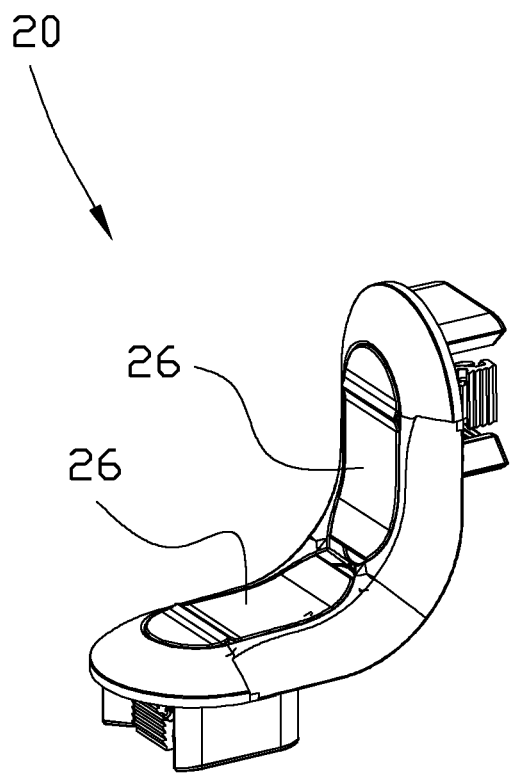
FIG. 6 shows the same bracket as FIG. 6 while in an activated state.

FIG. 5 shows another embodiment of a bracket 20 in accordance with the invention while in a deactivated state. FIG. 6 shows the same bracket 20 as FIG. 6 while in an activated state. The bracket 20 comprises two foot portions 22 which are connected together by means of a linking member 21. Each foot portion 22 comprises a gripper element 23 which is configured for being inserted into the hole 7 of a respective plate 5. The gripper element 23 comprises two arms 23A is mechanically controlled by a lever 26. The diameter in a direction in a plane parallel to the plate 5 can be enlarged by pressing the lever 26 towards the linking member 11. This is being referred to as activating the bracket 20. Releasing the lever 26 to reduce the diameter of the gripper element 23 is being referred to as deactivating the bracket 20. More details about the bracket of FIGS. 5 and 6 will be given hereinafter.

Figure 7:
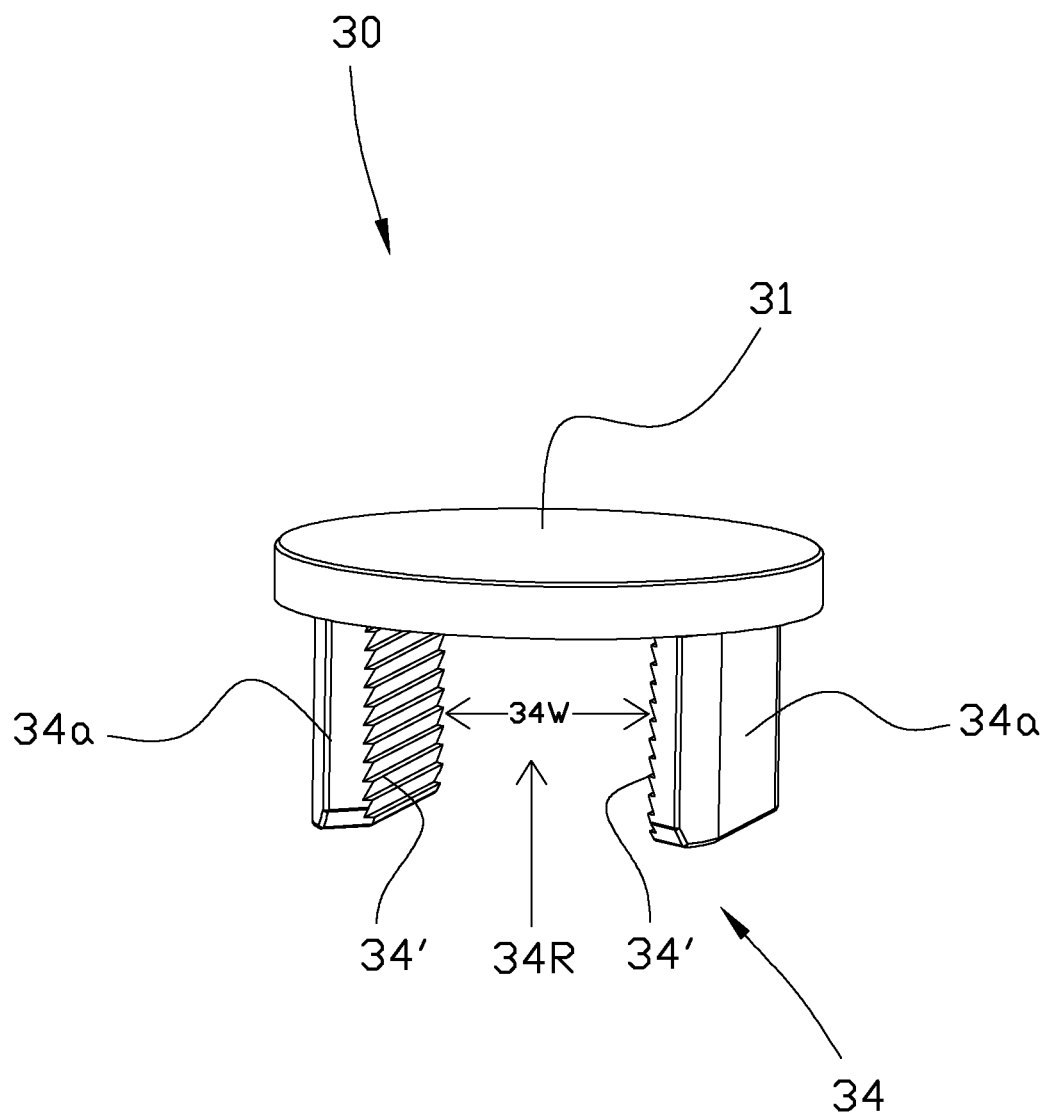
FIG. 7 shows an embodiment of an end bracket in accordance with the invention.

FIG. 7 shows an embodiment of an end bracket 30 in accordance with the invention. The end bracket 30 comprises a protrusion element 34 similar to the edge bracket 20 and the corner bracket 10 in that it comprises two arms 34A (connected by an end plate 31) which define a recess 34R having inner side walls 34W for receiving a respective gripper element 13,23 of another bracket 10,20. The protrusion elements 13,23 of the corner bracket 10 and the edge bracket 20 are configured the same. Another feature which is illustrated by FIG. 7 is the toothed surface 34' on the inner side walls 34W. Such toothed surface increases the gripping effect of the gripper element on the end bracket or other bracket to which the respective bracket is connected. In a variant of this embodiment the end plate 31 may also be replaced by a circular element that extends in a plane parallel to the end plate 31 and connects the respective arms 34A.

Figure 8:
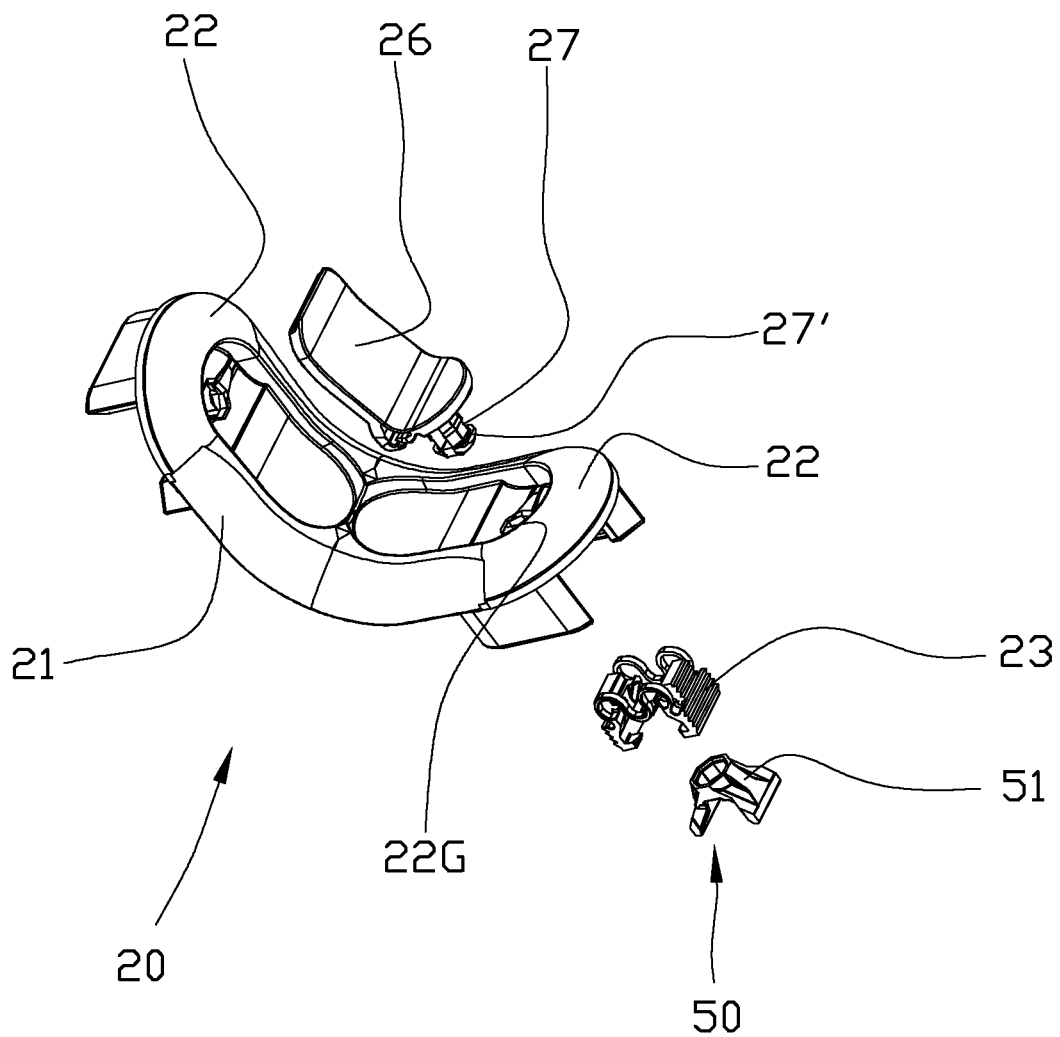
FIG. 8 shows an exploded view of the bracket of FIG. 5 when provided with an expansion member.

FIG. 8 shows an exploded view of the bracket 20 of FIG. 5 when provided with an expansion member. The bracket 20 comprises the parts already mentioned such as the linking member 21, the foot portions 22 and the lever 26. The lever 26 is further provided with a linking rod 27 which is configured to be coupled with the gripper element 23. FIG. 8 illustrates that bracket 20 can be made of individual parts which are configured to fit into and cooperate with each other. The figure shows that the gripper element 23 can be provide from a first side of the foot portion 22, while the lever 26 with the linking rod 27 is provided from the other side of the foot portion 22. The foot portion 22 comprises a receiving hole 22G wherein the linking rod 27 can be inserted. A similar hole is present in the gripper element 23, wherein the linking rod 27 is also inserted. In this embodiment there is provided an expansion member 50 having a tapered surface 51 and a further hole wherein the linking rod 27 is inserted. After insertion a locking foot 27' of the linking rod 27 is engaged with a further side of the expansion member 50 in a locking manner.

Figure 9:
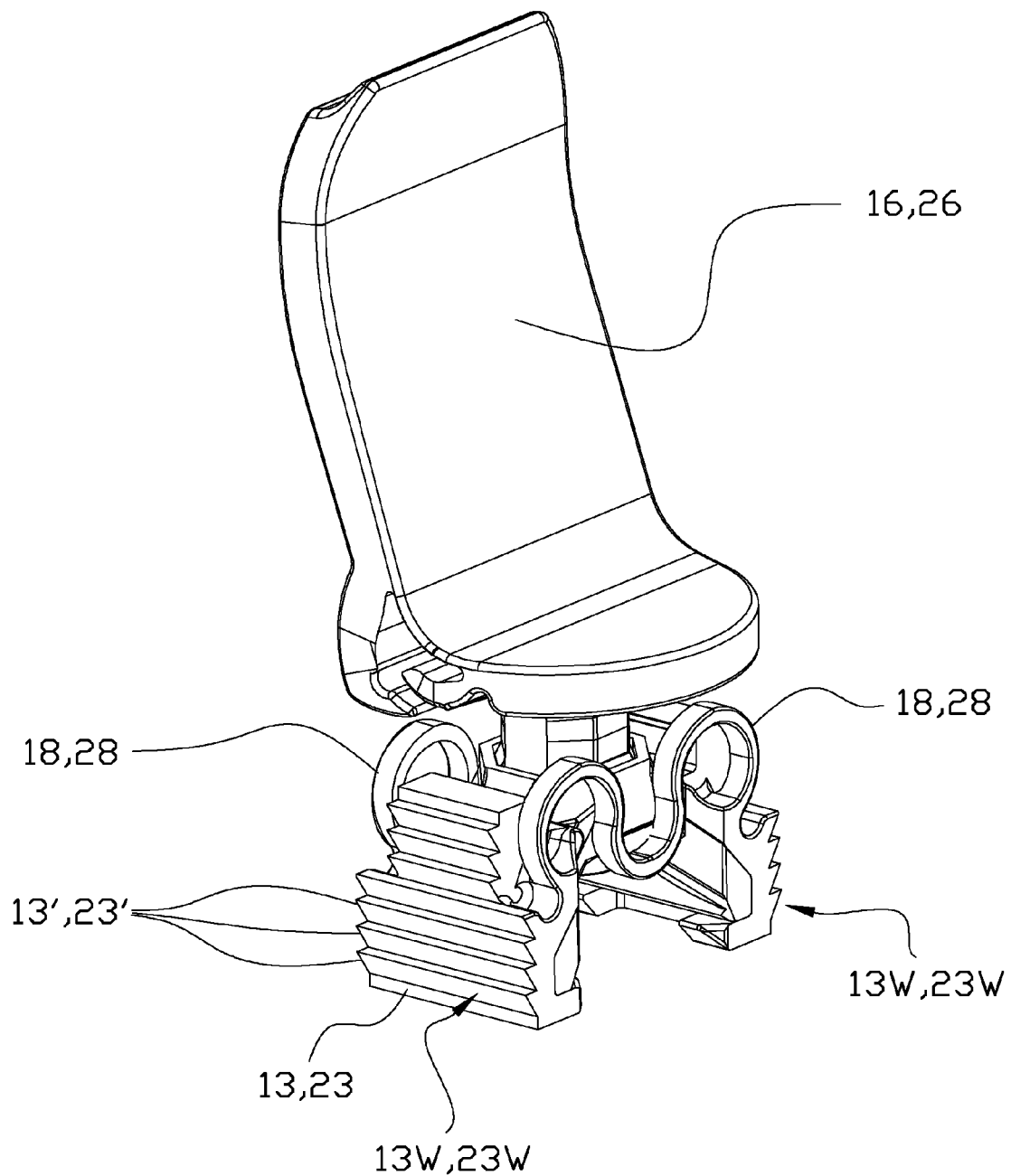
FIG. 9 shows a zoom view of parts of an embodiment of a bracket in accordance with the invention when provided with an expansion member.
Figure 10:
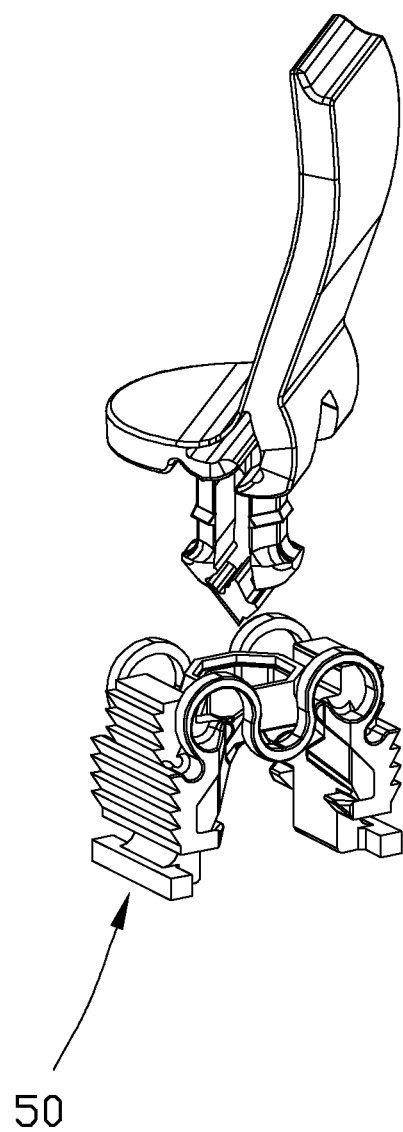
FIG. 10 shows the bracket of FIG. 9 with the expansion member pulled a bit out of the gripper element.

FIG. 9 shows a zoom view of parts of an embodiment of a bracket in accordance with the invention when provided with an expansion member. It must be noted that these parts can be the same for both the edge bracket and the corner bracket. FIG. 9 shows the lever 16,26 coupled with the linking rod 17,27 to the gripper element 13,23. The gripper element 13,23 comprises in this embodiment an elastic member 18,28 for facilitating the returning to a deactivated state of the bracket. The gripper element 13,23 comprises outer walls 13W,23W having a toothed surface 13',23' in this example. Such toothed surface increases the friction coupling between the gripper element and the hole 7 or further bracket (via its protrusion element). The gripper element is also provided with an expansion member inside. In order to illustrate this, FIG. 10 shows the bracket of FIG. 9 with a slightly different embodiment of the expansion member pulled a bit out of the gripper element.

Figure 11:
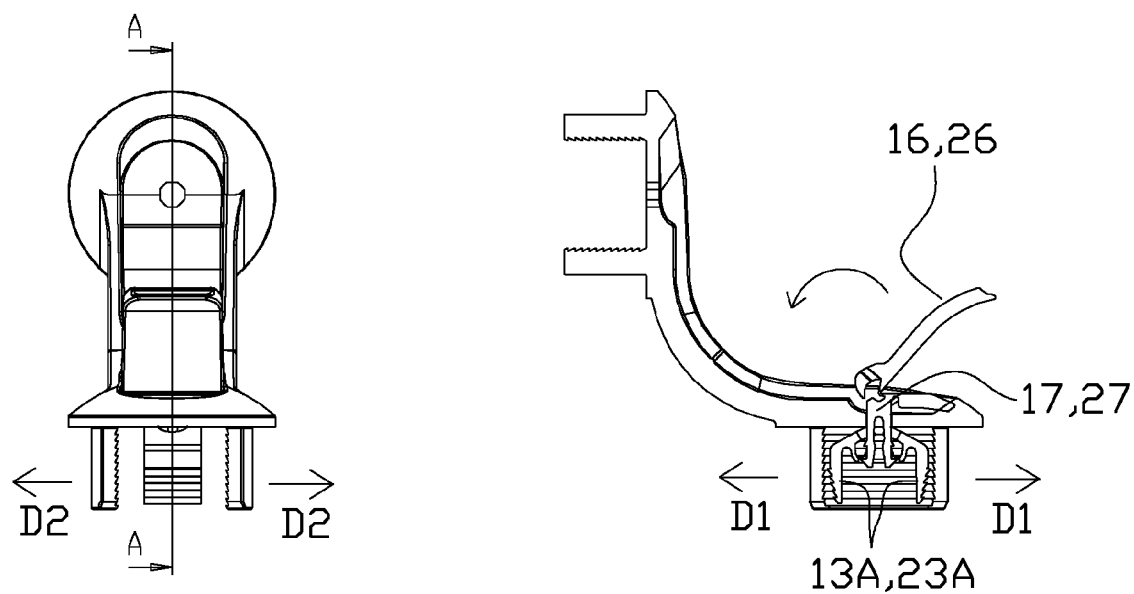
FIG. 11 shows a front view and a cross-sectional view of an embodiment of part of a bracket of the invention while in a deactivated state.
Figure 12:
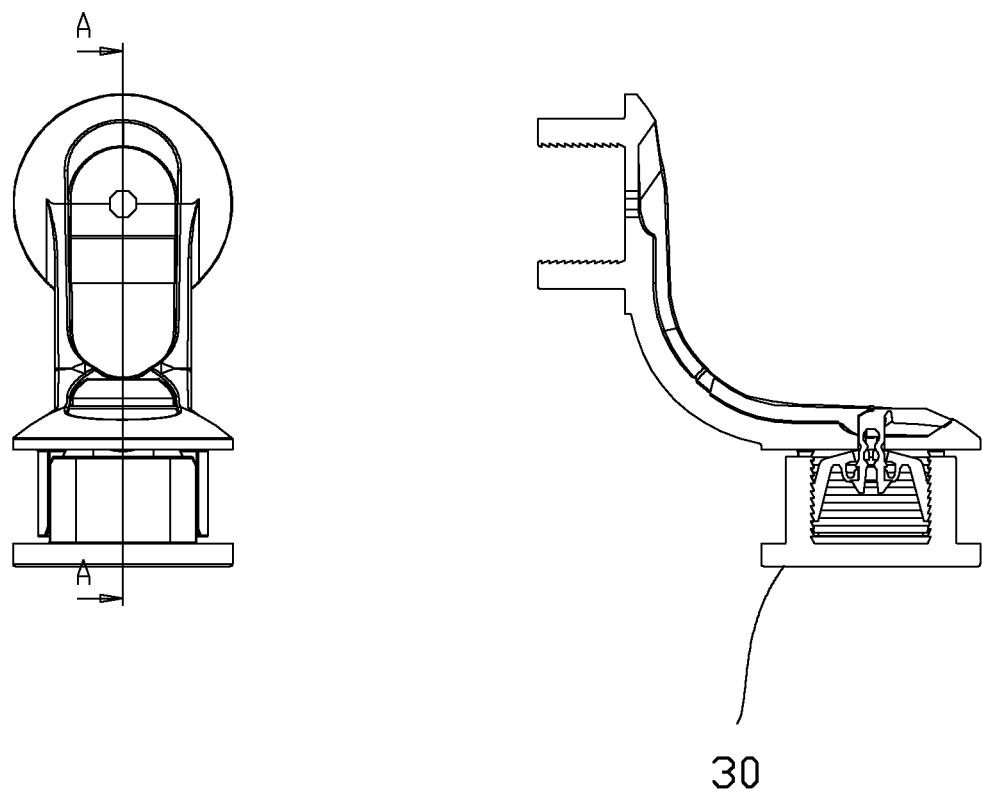
FIG. 12 shows a front view and a cross-sectional view of an embodiment of part of a bracket of the invention while in an activated state when provided with an end bracket on one of the foot portions.

FIG. 11 shows a front view and a cross-sectional view of an embodiment of part of a bracket of the invention while in a deactivated state. FIG. 12 shows a front view and a cross-sectional view of an embodiment of part of a bracket of the invention while in an activated state when provided with an end bracket on one of the foot portions. In FIGS. 11 and 12 dashing of cut parts has been omitted to render the figure clearer. This figure illustrates what happens if the lever 16,26 is pushed towards the bracket. When this is done the respective linking rod 17,27 is pulled a bit upwards because of a lever effect. This upward movement of the locking foot of the linking rod 17,27 makes the respective arms 13A,23A pivot around a pivot point and thereby move outwardly in a first direction D1. FIG. 11 further illustrates what is meant with the second direction D2 in this description, namely the direction parallel to the plate (not shown) and orthogonal to the first direction D1.

Figure 13:
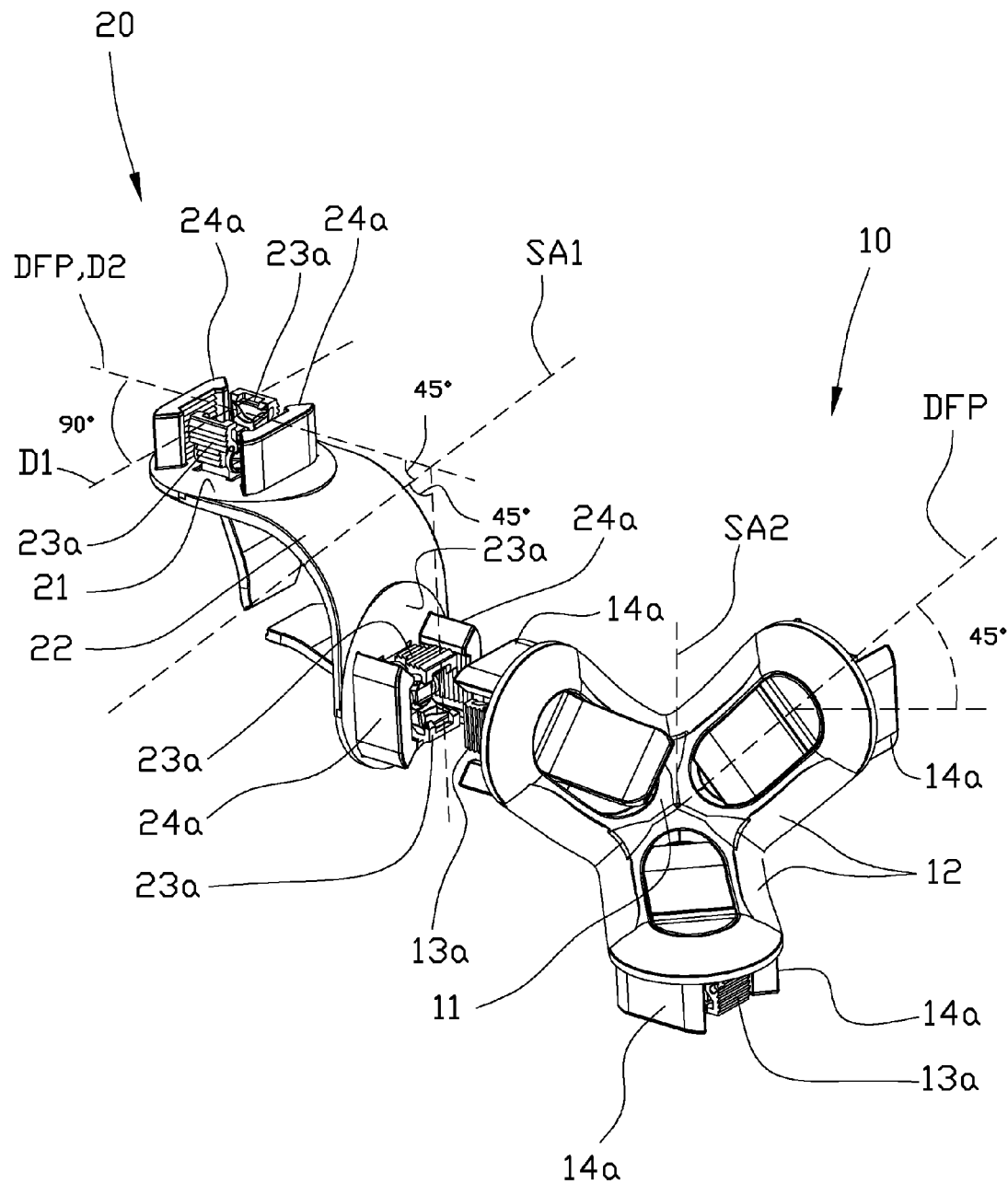
FIG. 13 shows an exploded view of a combination of a corner bracket and an edge bracket before mechanical coupling while being deactivated.
Figure 14:
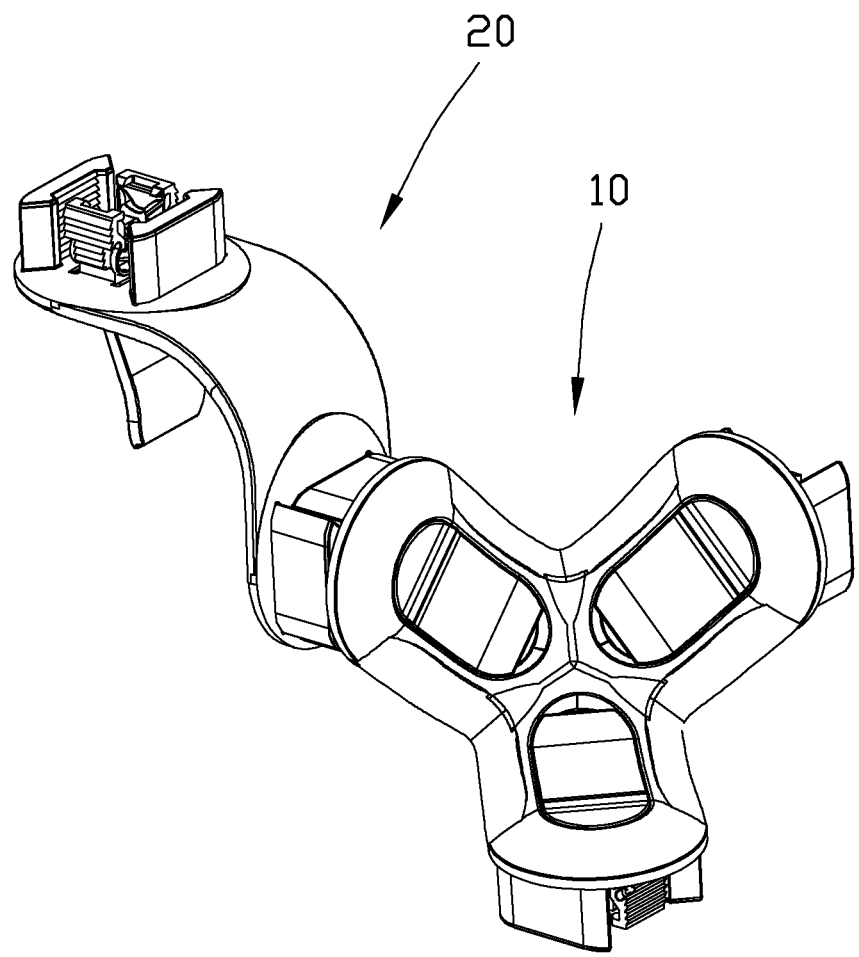
FIG. 14 shows the combination of FIG. 13 after mechanical coupling and activation.

FIG. 13 shows an exploded view of a combination of a corner bracket and an edge bracket before mechanical coupling while being deactivated. FIG. 14 shows the combination of FIG. 13 after mechanical coupling and activation. These figures are included to explain the differences in configuration of the corner bracket 10 and the edge bracket 20, such that they may be conveniently used in combination. The brackets 10,20 have different configurations in terms of the orientation of the respective gripper elements 13,23 and the arms 14A,24A of the respective protrusion elements 14,24. In the embodiments shown, the corner bracket 10 has a rotation symmetry, while the edge bracket 20 has no rotation symmetry. It must be noted, however, that this is not essential to the invention. Alternatively, different edge brackets and different corner brackets may be provided each having their specific configurations. Nevertheless, it is considered an advantage if there is only one type of corner bracket 10 and one type of edge bracket 20 required. The less number of different components the easier the use of the modular construction system.

The edge bracket 20 in FIG. 13 provides for a right angle between two plates (not shown) which it connects. A virtual axis SA1 is defined which cuts through the midpoint of the linking member 22 between the two foot portions 21. The virtual axis SA1 divides the right angle into equal angles of 45 degrees as illustrated in the figure. The foot portion having the gripper element 23 and protrusion element 24 lying face up is configured such that the gripper 23 is extending with its arms 23A into the first direction D1, and the protrusion element 24 is extending with its arms 24A into the second direction D2, orthogonal to the first direction. Furthermore, it must be noted that said directions are either orthogonal or parallel to the direction DFP in which the foot portion extends. When the edge bracket 20 is rotated over 180 degrees around said virtual axis, the orientation of said arms is inverted in that the arms 23A of the gripper element 23 extend in the second direction and the arms 24A of the protrusion element 24 in the first direction.

The corner bracket 10 in FIG. 13 provides for respective right angles between three plates (not shown) which it connects. A further virtual axis SA2 is defined, as illustrated in the figure that which cuts through the midpoint of the linking member 12 between the foot portions 11. The further virtual axis SA2 is defined in such direction (may be a bit difficult to see from the figure) that the corner bracket 10 is rotation symmetrical around this axis. The rotational symmetry is expressed in that the orientation of the respective arms 14A of the protrusion element 14 is such that the directions in which said arms 14A are extending make a 45 degrees angle with the direction DFP in which the respective foot portion 11 extends. Expressed differently, rotation of the corner bracket 10 over 120 degrees with respect to that virtual axis SA2 will not change the configuration of the foot portion, i.e. the orientation of the arms.

Figure 15:
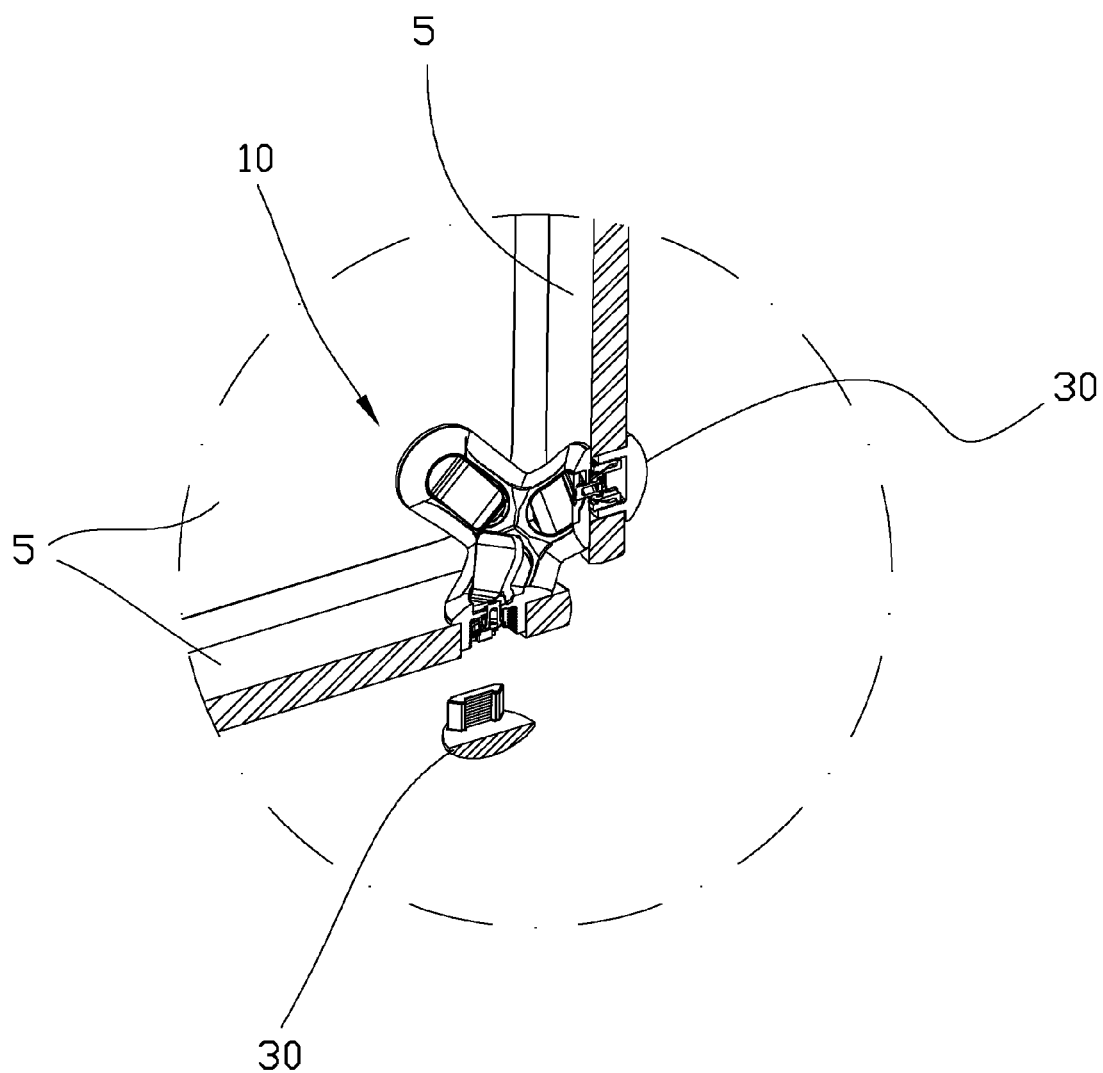
FIG. 15 shows how a corner bracket may be combined with end brackets.

FIG. 15 shows how a corner bracket 10 may be combined with end brackets 30. As is illustrated in the figure three plates 5 are gripped by the corner bracket 10, while end brackets 30 are provided from the other side such that the gripping elements of the corner bracket 10 grip into said end brackets to establish a good grip on the plate 10.

Figure 16:
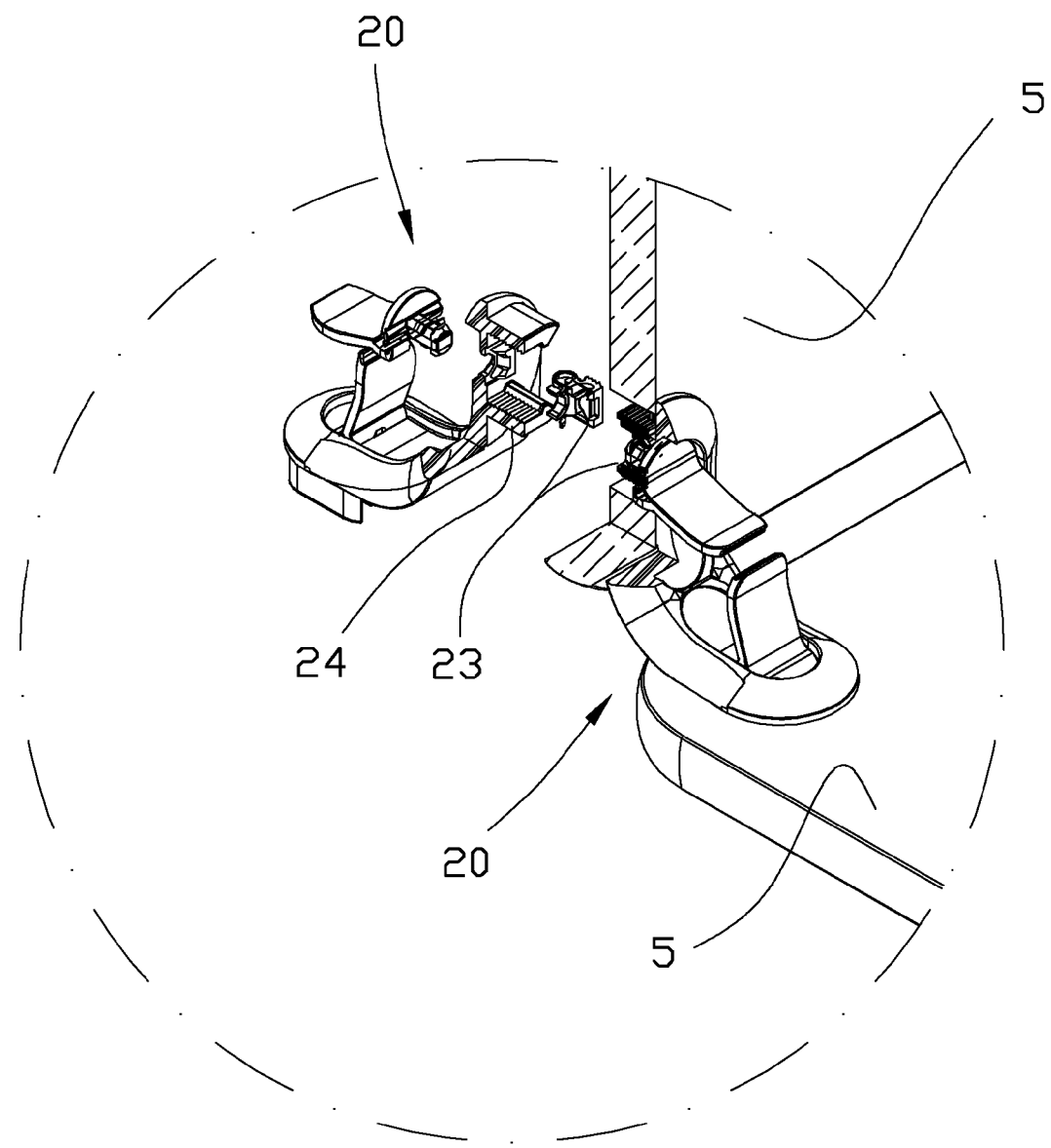
FIG. 16 shows how an edge bracket may be combined with a further edge bracket.

FIG. 16 shows how an edge bracket may be combined with a further edge bracket. In this figure two plates 5 are drawn. The gripping element 23 of a first one of the edge brackets 20 grips into the protrusion element 24 of a second one of the edge brackets 20 and the gripping element 23 of the second one of the edge brackets 20 grips into the protrusion element 24 of the first one of the edge brackets 20.

Figure 17:
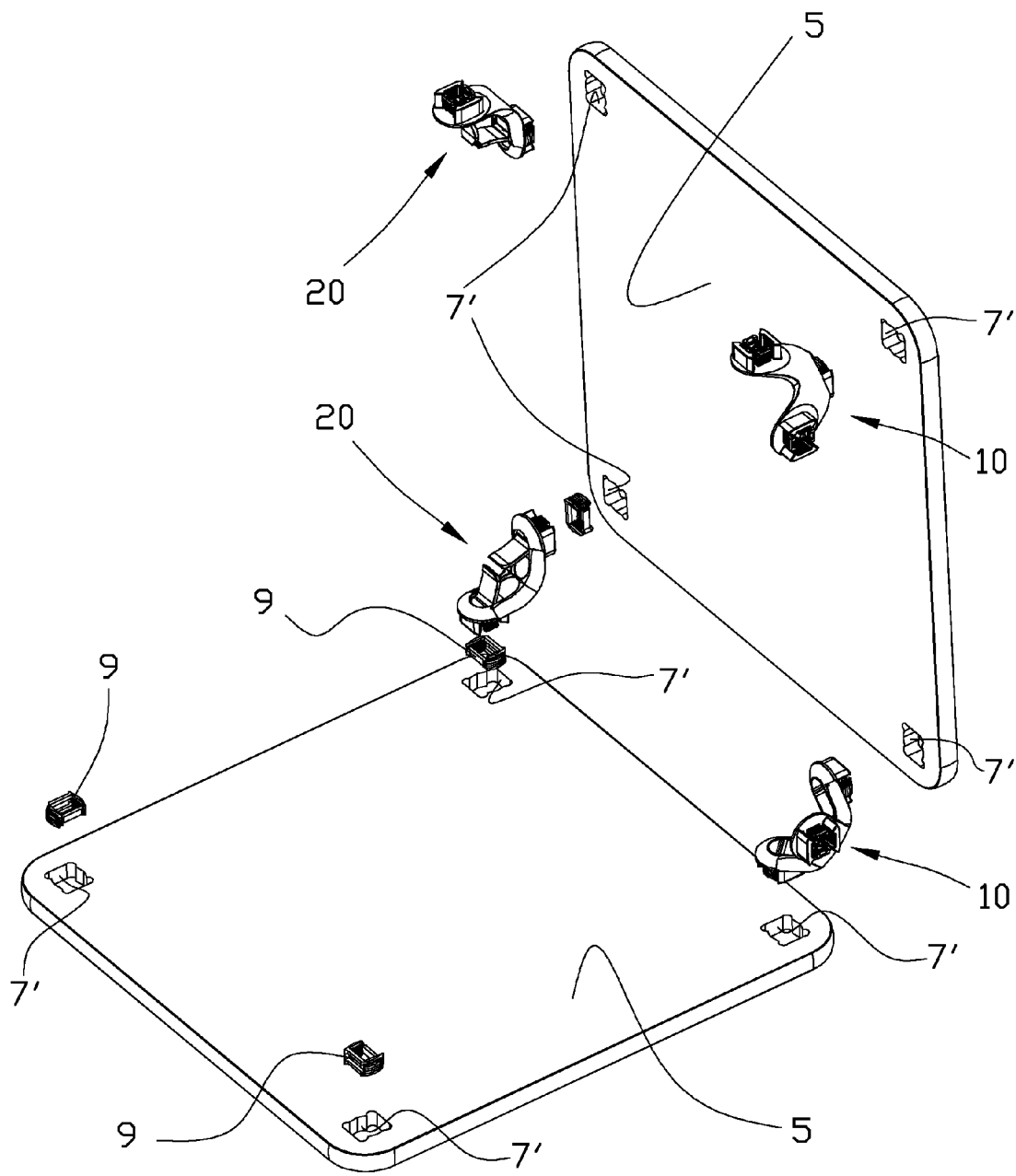
FIGS. 17 and 18 show an embodiment of a modular construction system in accordance with the invention that uses plates with blind holes.
Figure 18:
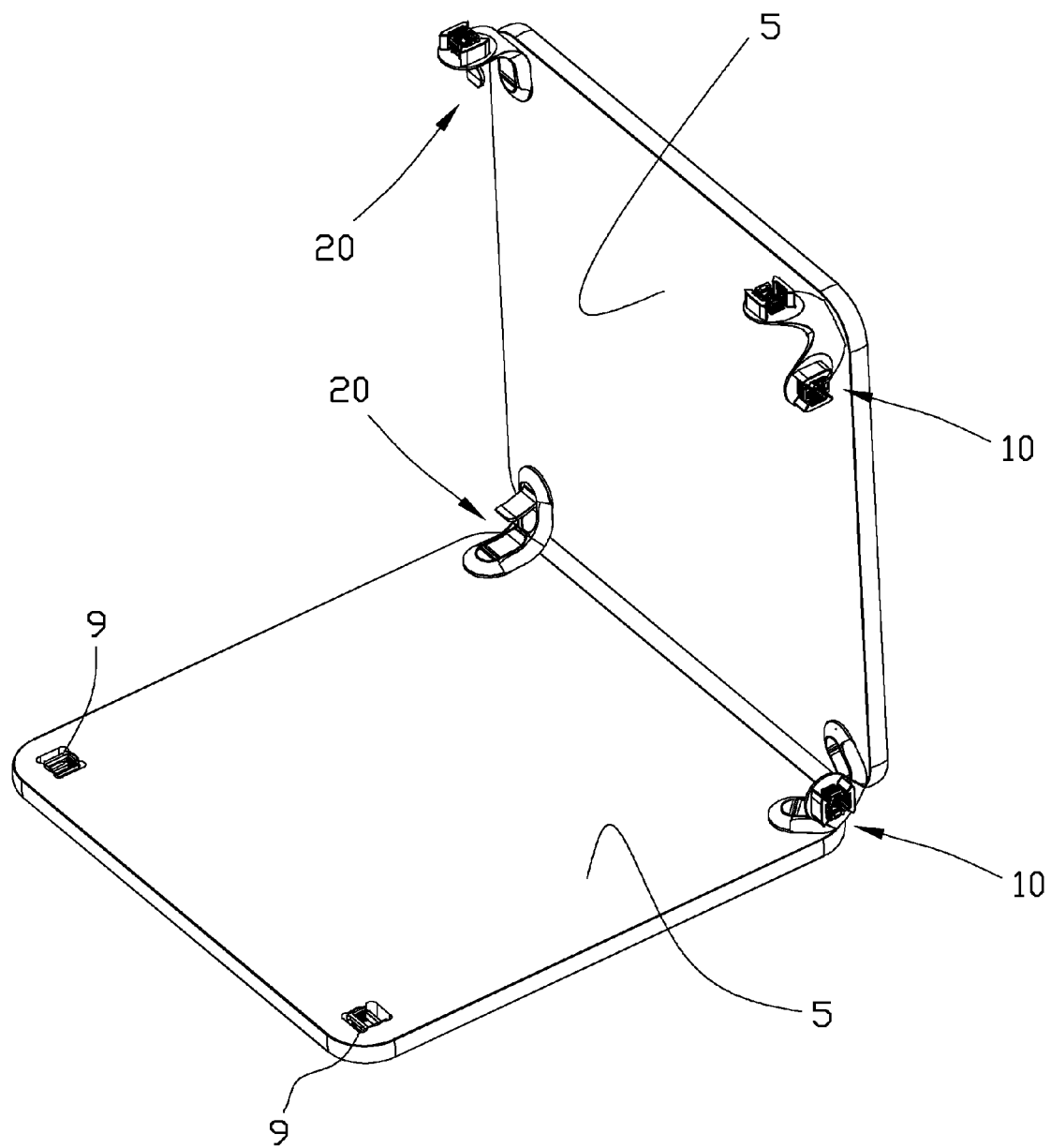

FIGS. 17 and 18 show an embodiment of a modular construction system in accordance with the invention that uses plates with blind holes. This embodiment will only be discussed in as far as it differs from the other embodiments. The main difference resides in the presence of blind holes 7' instead of through holes 7 (not shown in FIGS. 17 and 18) in the plates 5. Even though it is technically feasible to make the gripper element establish a friction coupling with sidewalls of the blind hole 7' directly, in this embodiment modified insertion caps 9 are provided in said blind holes 7' in order to provide a firm structure for the gripper elements to grip into. In the figure some insertion caps 9 have been omitted to render the figure less complex. Moreover, the modified insertion caps 9 provide for a toothed inner surface to enhance said gripping even more. The insertion caps 9 and the blind holes 7' are configured such that a firm friction coupling is established between the insertion caps 9 and the plate after insertion.

Below follows a qualitative discussion of the invention in different wordings for the purpose of facilitating an easier understanding of the invention. Furthermore, this section is supposed to supplement the above description in terms of further details on advantages, effects, applications, implementation aspects and variations.

The System

The shelving system is designed as a modular base system to build shelves in three dimensions (FIG. 1). The base system comprises two basic components that are repeated in different configurations; sheets (also referred to as "plates" in this description (FIG. 2) and brackets (FIGS. 3-7). While the sheets can have a virtually infinite number of dimensions and variations to the basic structure, there will in principle be two variants of the bracket—a corner bracket where three sheets meet (FIG. 3), and a bracket (edge bracket) where two sheets meet (FIG. 5) In addition there may be a closing dowel (end bracket) (FIG. 7) at the back and end sides of the shelving system.

A major benefit of the concept is that one can, due to the solution of single sheeted walls/hulls and fittings that are repeated, build and customize the system unrestricted in three dimensions, at the user's desire. There is not a dedicated "back side", "front side" or ending that limits the ability to build a cohesive system either in depth, height or width.

This feature provides the ability to build structures of shelving systems/space dividers, office layouts, private shelving solutions, storage solutions, etc.

Another feature that is significant is that every shelf setup can be mounted and dismounted in a variety of combinations, in accordance with the changing needs of the user. The more modules, the more possibilities. What is the depth of one combination can be established as the height of another.

A third property is that all the basic components can be mounted and dismounted without tools. The brackets bind the system together with a locking device that effectively connects the sheets with brackets throughout the assembly process (FIG. 15).

The fourth factor worth emphasizing is the material usage and transport economics. By using only single hulls in the solution, one saves a lot of materials in relation to corresponding solutions. At the same time, the system is completely flat packed for transport, and one can exploit the space in boxes/containers and trucks.

From an aesthetic perspective, it has been a goal to give the system a visually delightful and light impression. The spaces that in one embodiment are formed between the sheets is not to be "disturbed" by the brackets, which are pulled away from surfaces and corners of the system.

The Sheets

The sheets in the system may be made from any sheet material with a certain load carrying capacity along and across the sheet's orientation, but preferably in pulp such as for example, but not limited to, MDF sheets, chipboard, or laminated wood sheets such as for example plywood, and/or solid wood sheets. Other appropriate materials can be cardboard/cellulose, plastics, glass, acryl, metal, stone, Trespa™ and many others. The surface may for example be similar to the material, laminated with other materials, with graphics/illustrations, milled patterns, painted, polished, lacquered, etc. Most types of sheet materials and surface finishes will work well with the system.

In one embodiment universal sheets in the system are provided with one aperture at each of the corners (FIG. 2), or equivalent position, where the profile of the aperture matching the profile of the respective part of the brackets when a bracket facing a first side of a sheet is interconnected, through the aperture of the sheet, with another bracket facing a second side opposite of said first side of the sheet. The apertures or holes in the sheet can be all the way through for universal sheets. However, a sheet may also or alternatively be provided with one or more recesses not penetrating the sheet (FIG. 17).

The geometry of the sheets may in addition to a square or rectangular form vary from triangle to polygon, both symmetric and asymmetric, with curves and straight sides, but by far the most common form will be squares and rectangles. In addition to the variety in shape, the sheets also may have an infinite variety of perforations, cutouts, as long as they preserve the carrying capacity and have adequate support for the bracket where desired. Examples of variations in shape can be an X-(cross)-geometry, square/rectangle with opening in the Middle, 90/45/45 triangle with random or predetermined pattern perforation. The possibilities here are endless.

In one embodiment the sheets in the system do not touch each other, and each sheet may have a finished surface on all sides. In such an embodiment there is a slot between the sheets of the system, where they only connect with the other sheets in the system via the brackets. The sheets may be lined with lists, machined/sanded, painted, waxed, etc. The sheets may have everything from heavily rounded to pointed corners. In one embodiment the sheet is provided with rounded corners where the rounding is concentric with the circular "foot" of the brackets when they are mounted (see section 3 of the brackets). The sheets always have two visible sides, and do not form a double hull unless two shelving systems are set up side by side or on top of each other. The thickness of the sheets may vary, but is preferably equal in the same plane. For instance one may use unequal thickness for the horizontal sheets at the bottom and on top of the shelving, but those who are at the same level must be evenly thick. The size of the sheets can be of every possible combination of depth and width, but there may be restrictions on vertical and horizontal spans based on the various sheet materials technical properties.

In addition to the basic system, there is a similar system where the sheets are not or are still provided with apertures or holes and recesses, but where the outer edge of the sheet is milled with a uniform angle from both sides, so that the sheets creating one "room" in the shelve form a closed box. The profiles along the edges of the sheets are angled to match the number of sheets which form a closed space. For example, a common cube shaped room will have sheet edges milled at a 45 degrees angle, in measured from the sheet's surface.

Where the closed box act "alone" enclosed in whole or in part by open boxes as described in the basic system, the location of the angled edge could be from close to 0 mm from the inside of the sheet, and up to cover the full edge of the sheet. The remaining edge can be milled at the same angle or with a different profile, such as a radius or differently angled surface.

If the closed box joins a corresponding box in one or more directions, it must have a uniform angle on both sides of the sheet. The default option for this box will initially be a 45 degree angle from both sides of the sheet, and meet at the axis where the center planes of all the sheets of an intersection will meet. The sharp edge where the angular edges meet will be slightly rounded/sanded to avoid sharp corners.

Apart from shelving, but within the furniture segment, one can supplement the above solutions with larger sheets where the apertures or recesses for the bracket do not necessarily follow the edges of the sheets. The apertures or recesses could then be placed further from the edge, and not primarily as a through hole. In this way, one may mount a desk top plate on top of a box construction from the shelves described above.

Brackets

The brackets that bind the sheets together is at the heart of the system, and is the part of the system that has been given most attention in the design process. The brackets connect sheets by holding the sheet pinched between two brackets that are mounted from opposite sides of the sheet, and interconnects via the aperture or hole in the sheet.

Brackets will from now be addressed by the number of sheets they serve. The closing dowel at the end of the shelves serves 1 sheet, and is referred to as "B1" (end bracket) (FIG. 7). The bracket that has been applied at the inner edge where two sheets meet is referred to as "B2" (edge bracket) (FIG. 5). The bracket at the inner corner where three sheets meet is referred to as "B3" (corner bracket) (FIG. 3).

B2 and B3 are components which comprise of two main parts; bracket and lock. The number of locks in the bracket corresponds to the number of sheets to be connected by the bracket. However, B1 is a "bracket" with no associated lock. The lock may for example be made from plastic material suitable to the use of live hinges and in relation to strength/carrying capacity. The bracket is produced in a suitable material such as for example a metal alloy (e.g., Zinc Alloy/stainless steel/aluminum), but can also be made from plastic or other suitable materials.

Brackets with locks may like the sheets be designed and dimensioned so that they can carry the entire weight of the shelves in the way that the forces are being distributed through the system—from sheet to sheet.

In the embodiment shown in the figures, the sheets are connected in right angles, but much of it can be applied in the alternative angled solutions wherein sheets are connected in non-right angles.

Brackets may be mounted and dismounted without using screws or tools

The brackets may allow for an airy/floating aesthetics of the space between the shelves The brackets may work with varying sheet thicknesses The brackets may have stiffness equivalent to that of sheets meeting The brackets may be effective in mass production and have low unit cost Locking may be made in one single step Aesthetic qualities may be a high priority A very important feature of the bracket is that a gripping part of the lock (gripper element) and toothed arms on the bracket are designed so that two brackets always may be interconnected. All the toothed arms of the brackets, regardless if they are linked to B1, B2 or B3 are identical after factory mounting. That is, two identical locks meet when brackets are connected (FIG. 13). When locking, the lock of a first bracket grips the teeth on second bracket (FIG. 14), and the lock on the second bracket grips the teeth of the first bracket. The lock is mounted independently of the direction of the arm of the bracket so that the gripping part of the locks would be identical if they were rotated 180 degrees about an axis that goes 45 degrees relative to the edge of the sheet, and is located in a plane in the middle of the sheet of which the brackets are attached. With identical it is meant that the bracket may advantageously have a single configuration for the gripping part (this refers to the combination of the earlier mentioned gripper element 13,23 and the protrusion element 14,24) such that it may grip into a further gripping part similar to itself. In embodiments however, the orientation of the gripping part 13 and the protrusion element 14,24 may be rotated relative to the orientation of the foot portion 12,22 and this rotation may be different for different foot portions within the same bracket.

This has the effect that a bracket facing a first side of a sheet, may be interconnected, via the aperture in the sheet, with an identical bracket facing a second side being opposite of the first side of the sheet. Thus, only one type of each of said B2 brackets and B3 brackets is necessary.

The portion of the bracket that is visible when the shelves are mounted, is first and foremost designed based on aesthetic and secondly strength and functional requirements. The portion of the bracket for the lock is purely based on technical/functional requirements, and has also influenced the design of the visible portion.

The locking mechanism is a vital technical component of the bracket, and will be thoroughly described in text and illustrated with drawings below.

Other technical characteristics of the bracket may be:

Parallel toothed arms makes sure that there is contact between the edges of the hole in the shelving sheet and the outer edge of the toothed arms regardless of the sheet thickness. This also makes it possible to easily mill out the holes in the plate with a straight milling cutter from one side.

The arms (linking member) connecting the "feet" (foot portions) of the brackets may be designed for optimal tolerance of the forces which passes through the construction. Consequently the design may include an outer edge that forms a u-profile with bottom below the lock's arm, and reinforcements in the transition between the arms and against the foot of the bracket.

The space where the lock's arm will fit may be designed with a draft angle from a plane that tangent the three feet of B3 from manufacture tooling considerations, as it is difficult/costly to create mold slides for these cutouts.

The toothed arms are placed inwards from the edge of the brackets foot in order for it to be a supporting surface that meets the shelving sheet when the two opposite facing brackets are interlocked.

B1 can be designed as an additional button that meets B2 or B3 through the sheet, or as a connector insert that is pre-mounted in the sheets from the inside, and thereby allow a clean outside for the system, without any visible fittings.

The angle and arcs that make up the transition between the arms and the foot on the B2 and B3 are harmonized so that the lock can be used in both brackets.

The angle between the toothed arms and the relative direction of the lock's arm varies between B2 and B3, and internally in B2 with 45/90 degrees iterations. A gripping portion of the bracket is provided with an octagonal aperture due to the need of adjusting to this changed angle when mounted. If such adjustment is not needed, said aperture may have another form than octagonal.

The teeth on the toothed arms may have a horizontal to upwards angled grip surface, which correspond to the teeth on the lock (FIG. 12). The space between the teeth are governed by technical considerations related to the precision in the production of the lock, and the ability to stretch the lock structure to adapt to the current position of the teeth.

The profile of the recess for the lock is controlled by movement in the lock when mounting and dismounting the bracket, and is described under.

All brackets may be made from the same material, from tactile and aesthetic reasons, for example in metal with high density. Brackets may also be made from plastic, as long as it is possible to achieve sufficient rigidity to prevent the shelves from sagging.

The Lock

The lock (FIG. 10) is an important part of the bracket. The lock keeps the shelves together, ensures easy tool-less mounting, allowing for variations in sheet thickness, etc. The lock may be made from plastic, with specifications based on the requirements for stability over time, flexibility, strength and aesthetic considerations.

The lock comprises two main part; a gripping part (gripper element) and an operating part (lever and linking rod) activating the gripping part (FIG. 10).

The lower part is the seizing part of the lock. The gripping part may be designed with two symmetrical, in excess of 90 degrees angled L-shaped (upside-down) toothed arms, linked by a horizontal plate by using live hinges that connects each L with the plate (connection member) where the legs of the "L" meet (FIGS. 11 and 12). The teeth are located on the outside of the vertical arm of the L-shape, and has a horizontal to upwards angled gripping surface, that match the teeth of the bracket's toothed arms. It is equipped with an octagonal hole in the middle, which may have the same dimension and/or profile as the linking rod of the operating part of the lock. In the starting position, the toothed side of the lock's L-arms may be angled slightly inward, while the other side of the arm may be vertical. At the same time the other arm of the L points slightly upward, creating an open angle between it and the plate (FIG. 11). The lock should in original position be able to move freely in relation to the toothed arms of the opposing bracket for the disassembly to be done unobtrusively. It is therefore important that the gripping part of the lock has elastic properties so that returns to its original position (FIG. 11) even after being under tension for a long time (several years) in the locked state (FIG. 12). Another embodiment of the lower part The operating part of the lock comprises in the embodiment shown an arm with a oblong profiled cylinder (FIG. 11) (as in a camshaft), attached by a live hinge to the other part of the component in centre of the movement (FIG. 11). The live hinge making the approximate center of the about ⅓ of a circular cylinder that together with the octagonal linking rod form a T-shape (FIG. 11). The lower end of the rod may be equipped with a permanent snap-fit (FIG. 11) that allows for efficient assembly with the lower part of the Lock. From production engineering considerations, the upper part of the lock may also be equipped with a "lid" (FIG. 11) that covers the rest of the recess in the bracket's foot when the locking arm is fitted in place. As the starting position of the lock is when it is pulled down into the bracket, the lid can be equipped with a live hinge and formed/overwrought to make sure that the ends fit tightly about the opening when the lock is in its locked position.

The gripping part and the operating part may be mounted together with the bracket by pressing a linking rod of the operating part through the octagonal hole in the bracket and the octagonal hole in the plate of the gripping part, in one single move. In the mounting process, the two parts of the lock are positioned at the correct angle in relation to the design of the bracket foot they are to be assembled with. The two parts may be so designed that they are tightly fit after assembly, so that it does not occur slack or looseness between the parts, but not so much that it affects the possibility of free movement between the two opposite brackets before locking.

When the lock's arm is lowered, the linking rod is pulled up through the octagonal hole in the bracket. In that way, forces are transferred from the arm, which acts as a lever connected to the cam cylinder, so that the grip portion of the lock is strained with a certain force (power×arm), and pulls the opposite bracket towards itself in one movement (FIGS. 11 and 12).

The locking occurs when the upwards pointing arm of the L-shape hits the underside of the brackets foot. The first part of the movement pushes the teeth of the L-arm outward against the teeth of the matching bracket, so that they are connected through all the teeth that meet (FIG. 12). The rest of the movement is covering two functions. It pulls the lock up, and by that ensures that both brackets are drawn towards the sheet when the teeth has grasped, at the same time the "L" is overwrought, and thus prevents the teeth from slipping as the force that pulls the brackets towards each other increases. All the time there is a force that works against the direction of movement as the L-form is pressed against the underside of the brackets foot. This ensures that unwanted movement between the parts does not occur.

It is an advantage if the locks in pre-assembled position, at the centre (the end of the linking rod's snap-fit) does not build more than 50% of the minimum sheet thickness of the system from the underside of the brackets foot. A larger dimension here can make the locks become yoked up when they meet, and potentially prevent that the brackets may be dismounted.

To ensure firm and permanent assembly of the components, the lock may be designed so that it is allowed to stretch without permanent deformation the same length as the distance between two teeth, between the teeth of the L-shape and the oblong profiled cylinder in the longitudinal direction along the (octagonal) rod.

Other Uses

By upscaling the bracket, it could be adapted to systems for other applications than the ones described here. For instance, to use with dividers in trade fairs or conference contexts, other temporary interior solutions and outdoor screen walls or more lasting constructions as winter gardens and the like. The invention relates to:

1. A bracket for connecting at least two sheet elements together via an aperture provided in a portion of the sheet, the bracket comprising at least two connection means each of which comprising:
   a foot portion for abutting a first face of the sheet, the foot being provided with fixing means (gripper element) for protruding into a portion of the aperture;
   a locking means assembled with the foot portion, the locking means comprising a gripping part and an operating part for influencing the gripping part, the gripping part being provided with gripping means for protruding into a portion of the aperture; and
   linking means connecting the at least two connection means,
wherein a fixing means of first bracket facing a first side of a sheet is structured in a manner allowing interconnection with a gripping means of a second bracket facing a second side opposite of said first side of the sheet, the foot portion of first bracket being identical with the foot portion of the second bracket.

With the last part of the previous sentence it is meant that the bracket may advantageously have a single configuration for the gripping part (this refers to the combination of the earlier mentioned gripper element 13,23 and the protrusion element 14,24) such that it may grip into a further gripping part similar to itself. In embodiments however, the orientation of the gripping part 13 and the protrusion element 14,24 may be rotated relative to the orientation of the foot portion 12,22 and this rotation may be different for different foot portions within the same bracket.

The invention further relates to:

2. A method of connecting at least two sheet elements together, the sheet elements being provided with apertures, the method comprising:
   bringing at least two sheets in a mutual position;
   bringing a fixing means of a first bracket according to claim 1 into the aperture from a first side of the sheet;
   bringing a second bracket according to claim 1 into the recess from an opposite side of the first side;
   bringing the gripping parts of the locking means of each of the first and second bracket into engagement with the fixing means of the other one of the second and first bracket, respectively.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. A bracket for use in a modular construction system, wherein plates are mechanically connected in a releasable manner to form a structure, wherein the plates comprise at least one hole in a part thereof, wherein the hole is configured for being coupled to the bracket, wherein the bracket comprises:
   at least two foot portions for being coupled to respective plates, wherein each foot portion comprises a gripper element for being inserted into the hole of the plate and
   a linking member connecting the at least two foot portions and establishing a predefined fixed distance and a predefined fixed relative orientation between said foot portions,
   wherein the gripper element is configured for enlarging a diameter in at least one direction in a plane parallel to the plate to obtain a friction coupling between the bracket and the plate or between the bracket and a further bracket provided from another side of the respective plate, when activated in operational use, and for reducing the diameter of the gripper element in a first direction of the plane parallel to the plate to release the bracket from the plate, when deactivated in operational use;
   wherein each foot portion comprises a protrusion element extending substantially in a second direction perpendicular to the first direction within the plane parallel to the plate, wherein the protrusion element comprises a recess having inner walls for receiving a respective gripper element of a respective similar foot portion of a further bracket.

2. The bracket as claimed in claim 1, wherein the bracket has a single configuration for the gripper element and the protrusion element such that it may grip into a further configuration of a respective gripper element and a respective protrusion element of a further bracket similar to itself.

3. The bracket as claimed in claim 1, wherein the gripper element comprises at least two arms spaced apart and mechanically coupled with each other with a connecting member, each arm having a respective outer wall that is at least partially movable or rotatable in an outward and inward direction, respectively.

4. The bracket as claimed in claim 3, wherein the arms are each coupled to the connecting member via a respective pivot point, wherein said outward rotation or moving of said respective arms around the respective pivot points starting from a respective release position, causes the enlarging of the diameter of the gripper element.

5. The bracket as claimed in claim 4, wherein the bracket further comprises an expansion member, with a tapered surface, wherein said outward rotation or moving of said arms is effected by pressing the expansion member in between said arms towards the connecting member when the bracket is activated in operational use.

6. The bracket as claimed in claim 4, wherein each arm comprises a respective activation member for forcing a rotation of the respective arm around the respective pivot point, wherein said outward rotation of said arms is effected by pressing said activation member in the direction of the connecting member for pivoting the respective arms around their respective pivot points when the bracket is activated in operational use.

7. The bracket as claimed in claim 5, wherein a linking rod and a lever acting upon said linking rod for effecting said pressing when the bracket is activated in operational use.

8. The bracket as claimed claim 1, comprising an elastic member for bringing the bracket in a respective release position when the bracket is deactivated in operational use.

9. The bracket as claimed in claim 1, wherein the gripper element comprises a toothed surface on the outer walls to increase the friction between the gripper element and the plate or between the gripper element and the further bracket.

10. The bracket as claimed in claim 9, wherein the protrusion element comprises a further toothed surface on the inner walls defining the recess, wherein the further toothed surface is configured for receiving the toothed surface of the gripper element when the bracket is activated in operational use.

11. The bracket as claimed in claim 1, wherein the bracket comprises two foot portions that are connected by the linking member for establishing a respective right angle between said foot portions to form an edge bracket for establishing a further respective right angle between said two plates.

12. The bracket as claimed in claim 11, wherein said foot portions are configured such that, when the bracket is rotated over 180 degrees with respect to a virtual axis which divides the respective right angle in two equal angles of 45 degrees, the configuration of the respective gripper element and the respective protrusion element is rotated over 90 degrees, wherein the configuration of each respective foot portion is such that the respective gripper element and the respective protrusion element extend in orthogonal and parallel directions only with respect to the respective direction in which the respective foot portion extends.

13. The bracket as claimed in claim 1, wherein the bracket comprises three foot portions that are connected by the linking member for establishing a respective right angle between said foot portions to form a corner bracket for establishing further respective right angles between pairs of said three plates.

14. The bracket as claimed in claim 13, wherein said foot portions are configured such that, when the bracket is rotated over 120 degrees with respect to a virtual axis which divides the respective right angles in two equal angles of 45 degrees, the configuration of the respective gripper element and the respective protrusion element remains the same, wherein the configuration of each respective foot portion is such that the respective gripper element and the respective protrusion element extend in a direction making a 45 degrees angle with respect to the respective direction in which the respective foot portion extends.

15. A modular construction system comprising at least two plates which are mechanically coupled in a releasable manner with a bracket for use in a modular construction system, wherein plates are mechanically connected in a releasable manner to form a structure, wherein the plates comprise at least one hole in a part thereof, wherein the hole is configured for being coupled to the bracket, wherein the bracket comprises:

at least two foot portions for being coupled to respective plates, wherein each foot portion comprises a gripper element for being inserted into the hole of the plate and a linking member connecting the at least two foot portions and establishing a predefined fixed distance and a predefined fixed relative orientation between said foot portions, wherein the gripper element is configured for enlarging a diameter in at least one direction in a plane parallel to the plate to obtain a friction coupling between the bracket and the plate or between the bracket and a further bracket provided from another side of the respective plate, when activated in operational use, and for reducing the diameter of the gripper element in a first direction of the plane parallel to the plate to release the bracket from the plate, when deactivated in operational use;

wherein each foot portion comprises a protrusion element extending substantially in a second direction perpendicular to the first direction within the plane parallel to the plate, wherein the protrusion element comprises a recess having inner walls for receiving a respective gripper element of a respective similar foot portion of a further bracket.

* * * * *